O. SPAHR.
SELF HEATING SAD IRON.
APPLICATION FILED JULY 16, 1914. RENEWED NOV. 4, 1915.
1,177,729.
Patented Apr. 4, 1916.
2 SHEETS—SHEET 1.
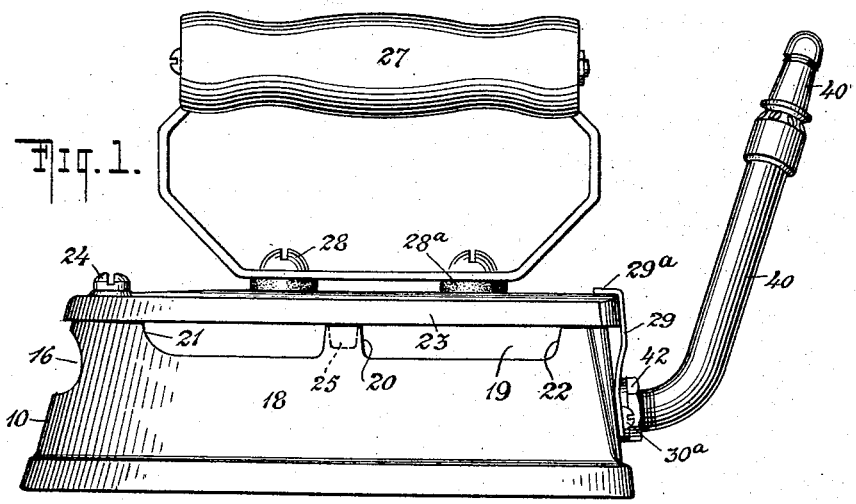
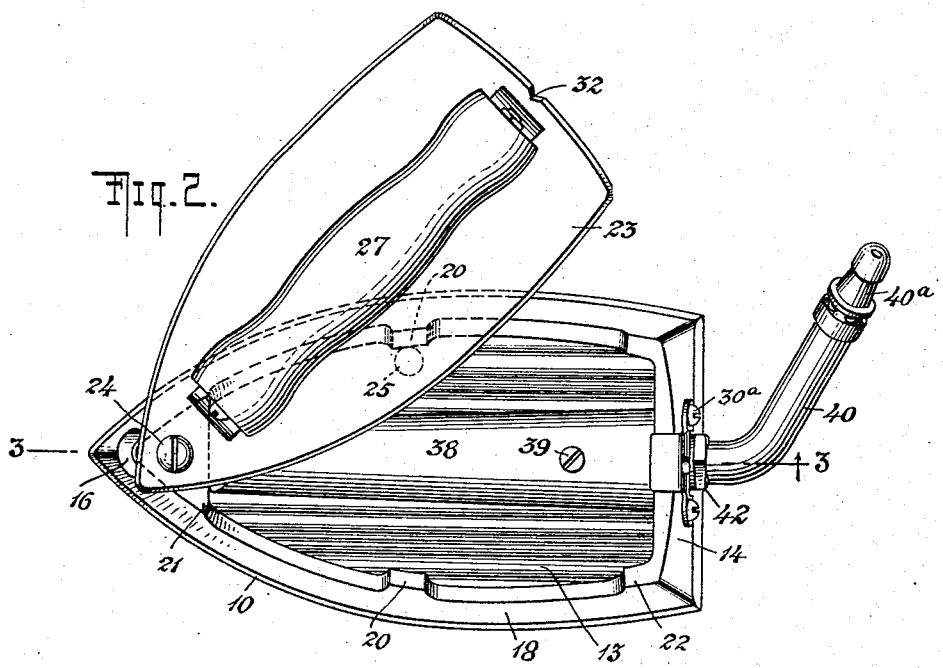
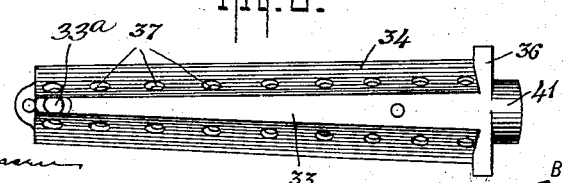
WITNESSES
INVENTOR
OTTO SPAHR
BY
ATTORNEYS O. SPAHR.
SELF HEATING SAD IRON.
APPLICATION FILED JULY 16, 1914. RENEWED NOV. 4, 1915.
1,177,729.
Patented Apr. 4, 1916.
2 SHEETS—SHEET 2.
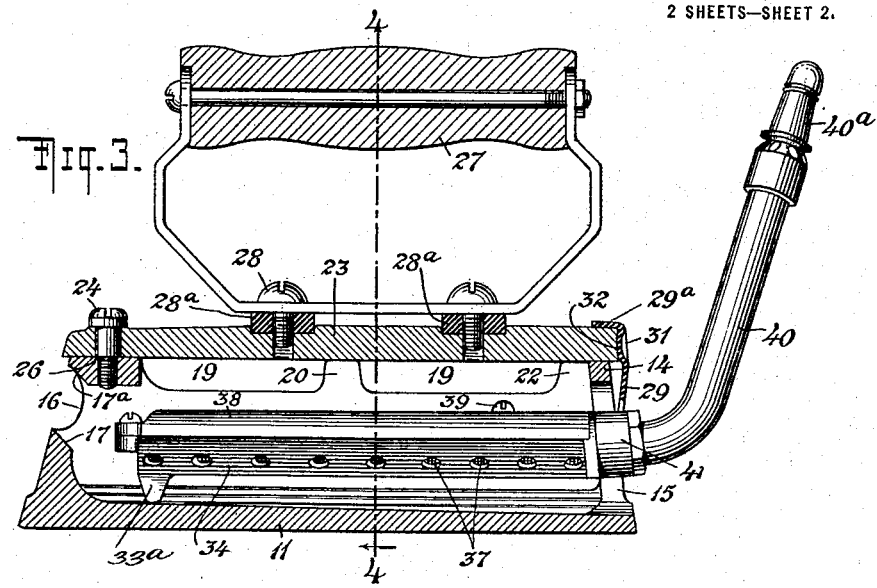
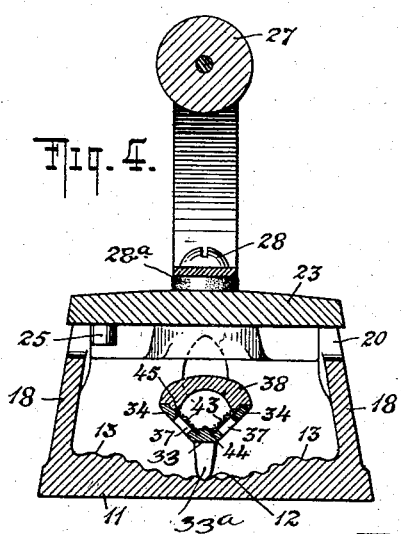
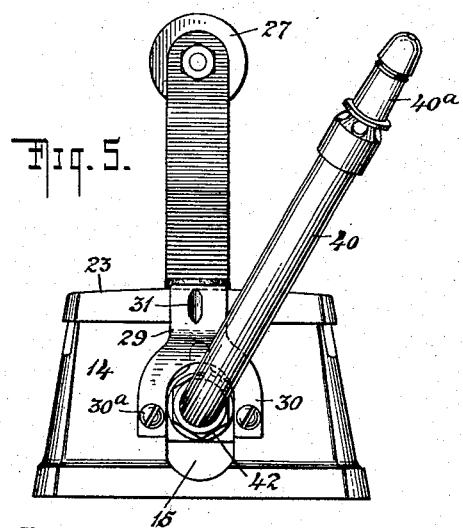
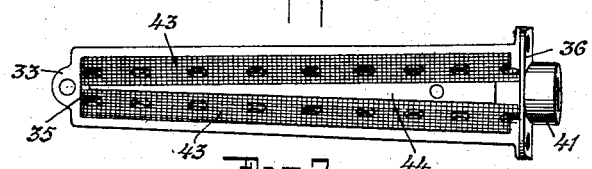
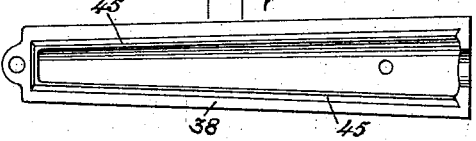
WITNESSES
G. V. Rasmussen
Jno. A. Kehlenbeck
INVENTOR
OTTO SPAHR
BY
Briesen & Knauth
ATTORNEYS

UNITED STATES PATENT OFFICE.

OTTO SPAHR, OF PHILADELPHIA, PENNSYLVANIA.

SELF-HEATING SAD-IRON.

1,177,729.  Specification of Letters Patent.  Patented Apr. 4, 1916.

Application filed July 16, 1914, Serial No. 851,266. Renewed November 4, 1915. Serial No. 59,693.

*To all whom it may concern:*

Be it known that I, OTTO SPAHR, a citizen of the United States, and a resident of the city and county of Philadelphia, State of Pennsylvania, have invented certain new and useful Improvements in Self-Heating Sad-Irons, of which the following is a specification.

My invention relates to self-heating sad irons in which a gas is utilized as a fuel and has for its object to simplify and improve the construction of irons of this type.

My improvement will be fully described hereinafter and the features of novelty will be pointed out in the appended claims.

Reference is to be had to the accompanying drawings which illustrate one specific embodiment of my invention and in which—

Figure 1 is a side elevation of my improved iron; Fig. 2 is a plan view thereof showing the cover partly opened; Fig. 3 is a longitudinal section on the line 3—3 of Fig. 2, Fig. 4 is a cross-section on the line 4—4 of Fig. 3; Fig. 5 is a rear end view of the iron; and Figs. 6, 7 and 8 are detail views of the burner forming a part thereof.

In the drawings 10 represents the hollow body of the iron, the bottom 11 of which is formed with a central concave portion 12 extending substantially throughout the length of said body and with surfaces 13 located along opposite sides of said concave portion 12 as shown in Fig. 4. The concave portion 12 and surfaces 13 may be corrugated lengthwise as shown or may be smooth if desired and are inclined upwardly to a greater or less degree from the rear end of the iron to the front end or apex thereof as shown best in Fig. 3. In its rear wall 14 the body is provided with an inlet opening 15 located in the lower portion thereof in close proximity to the concave portion 12 of the bottom 11 and at its front end or apex said body is formed with an outlet opening 16 located at a distance above said concave portion 11. As shown in Fig. 3, the upper and lower portions of said opening 16 are inclined upwardly or beveled toward the outside as indicated at 17 and 17$^a$ for the purpose to be more clearly described hereinafter. The side walls 18 of the body are cut away at their upper edges to form apertures 19, central projections 20 and opposite end projections 21 and 22, the projection 21 being located at the apex or front end of the body while the projection 22 is located at the rear end of the iron and is formed by the rear ends of the side walls 18 and the rear wall 14 as clearly shown in Fig. 2. A cover 23 is pivotally secured upon the projection 21 by means of a screw 24 to swing in a horizontal plane or in a direction parallel to the bottom 11 and is provided with a lug 25 depending from the inner surface of said cover 23 and adapted for engagement with the opposite central projections 20 whereby the pivotal or swinging movement of said cover in opposite directions is arrested. The lug 25 is so positioned on said cover as to arrest the movement thereof in coöperation with said projections 20 at the proper points to properly close the body or to expose the interior thereof. In order that a binding of the cover 23 may be prevented the pivot screw 24 is preferably formed with a shoulder 26 adapted to engage the projection 21 and limit the screwing movement thereof. The distance between the said shoulder 26 and the head of the screw is slightly greater than the thickness of the cover 23 at its front end so that it is impossible to cause said screw to exert a binding action on said cover, which is thus freely movable about the smooth portion of the shank of said screw as is clearly illustrated in Fig. 3.

A handle 27 of any suitable type is attached to the cover in any desirable manner as by screws 28 and serves the double purpose of providing a means for readily manipulating the cover 23 about its pivot 24 and for manipulating the iron during use thereof. In the construction as shown washers 28$^a$ of asbestos or other heat insulating material are located between the handle 27 and cover 23, the said washers being preferably seated in suitable recesses provided in the cover for this purpose.

In order that the cover 23 may be automatically locked in its closed position and released when it is desired to swing said cover to its open position I provide a resilient catch member 29 preferably having spaced legs 30 detachably secured to the rear wall 14 by means of screws or the like 30$^a$ and provided with a tooth or projection 31 adapted to snap into a notch 32 formed in the rear edge of the cover 23 as shown in Fig. 2. The projection 31 and notch 32 are preferably located beyond the longitudinal median line of the iron to the left in Fig. 5 for the purpose to be more fully described hereinafter. It will be understood that the notch 32 and projection 31 are so formed that said projection may be forced out of said notch against the tension of the resilient catch member 29 by exerting a pressure on the cover in a direction to swing same on its pivot to an open position. It will thus be seen that when it is desired to open the cover 23 it is only necessary to press upon the handle 27 in the proper direction, while a reverse movement of the cover 23 through the medium of the said handle will finally bring the notch 32 into proper position to permit the projection 31 to again snap into same and thus again lock the cover in its closed position, neither operation necessitating any other adjustment of other elements. With this arrangement when opening or closing the cover it is unnecessary to handle any portion of the iron which becomes hot during use thereof, the manipulation of said cover being accomplished entirely through the medium of the handle 27 which remains relatively cool at all times. As the pressure to open the cover 23 is exerted a tendency to tip the iron ofttimes occurs before the projection 31 is finally released from the notch 32. This tendency is overcome in the present invention by locating the notch 32 and projection 31 beyond the longitudinal median line of the iron as described, this arrangement bringing these elements into a position where the pressure exerted on the handle and ordinarily tending to tilt said iron is converted into a pressure tending merely to separate the notch and projection, it being of course understood that the handle 27 is located in registry with the said longitudinal median line of said iron and thus out of vertical registry with said projection and notch. To prevent the cover when closed from being lifted relatively to the body as the iron is raised during use I provide the resilient catch member 29 with an approximately horizontal finger 29$^a$ adapted to extend over the cover 23 and hold the same as clearly shown in Fig. 3.

It will of course be apparent that the cover 23 may be pivoted to the body at its rear end, or in other words the positions of the pivot 24 and resilient catch member 29 reversed if desired.

The burner forming part of the present construction comprises a trough-shaped member 33 tapering from its rear end toward its front end and having inclined or downwardly converging side walls 34 and opposite end walls 35 and 36. A series of jet openings 37 is formed in each of the side walls, the openings 37 nearest the rear end wall 36 being arranged with their axes extending at substantially right angles to the major axis of said member 33, while the axes of successive openings 37 gradually assume a more acute angle to said major axis as the front wall 35 is approached. In other words as the apex of the iron is approached the openings 37 gradually point more and more toward the same for the purpose to be clearly described hereinafter, all of said openings of course projecting downwardly toward the bottom 11 as is clearly shown in Fig. 4. A cover 38 is detachably secured upon the member 33 in any suitable manner as by screws 39 and together therewith forms a chamber into which the fuel is conducted by means of the customary mixing tube 40 which has its one end in screw-threaded engagement with a bushing 41 on the rear wall 36 and communicates with said chamber through an opening therein. At its free end the tube 40 is provided with a customary nipple 40$^a$ adapted to receive one end of the usual fuel conducting tube in the well known manner. In order that said tube 40 may be secured in position at various degrees of inclination relatively to the body, I provide a lock nut 42 adapted to be screwed up against the bushing 41. The inner ends of the jet openings 37 are preferably covered with wire screens, gauze or the like 43, the latter being held and secured in operative position in the form illustrated by means of ribs or flanges 44 and 45 formed respectively on the interior surfaces of the member 33 and cover 38, lengthwise movement of said screens being prevented by the end walls 35 and 36.

When in operative position the burner above described is located within the body 10 above and in registry with the concave portion 12 of the bottom 11, the bushing 41 and tube 40 extending through a suitable opening in the rear wall 14 and the nut 42 being readily accessible from the exterior of the iron. The burner may be secured or suspended in operative position in the body 10 in any suitable manner as for instance by means of the screws 30$^a$ which secure the resilient member 29 in place, the legs 30 of the latter in this case extending upon opposite sides of or straddling said burner or rather the bushing 41 thereof. With this arrangement the screws 30$^a$ extend through the rear wall 14 into the end wall 36 of the member 33 and serve to properly support the burner and its connected parts in position. If desired the forward end of the burner may be provided with a supporting lug 33$^a$ adapted to rest upon the inner surface of the bottom 11, although in some cases this lug 33$^a$ may be omitted and the screws 30$^a$ alone relied upon to properly position said burner. As shown in the drawings the tube 40 is located exteriorly of the body at the rear end thereof, and as before stated the angle of inclination of this tube 40, may be changed by simply loosening the nut 42 and then adjusting said tube in an arc of a circle to the left or right when looking at the rear end of the iron. After the desired adjustment has been secured the tube 40 may be fastened in its adjusted position by simply again screwing the said nut firmly against the bushing 41. In this manner the iron may be readily and quickly changed from a right hand to a left hand iron and vice versa as desired.

In operation the fuel is conducted into the burner chamber by the tube 40 and passes through the screens 43 and out of the openings 37 at which said fuel is ignited to provide a plurality of jets of flames directed downwardly toward the bottom 11 and gradually more and more toward the front end of the iron and contacting with the concave portion 12 of said bottom, the latter in this manner being quickly heated to the desired degree. At the same time air is drawn or passes into the body of the iron through the opening 15 and contacts with or passes through and around the flame jets to cause a complete and thorough combustion of the fuel, the products of combustion passing out of the opening 16 and apertures 19 located respectively at the apex and upper side portions of the body. As the inside surface of the bottom 11 is preferably inclined upwardly and as the inlet opening 15 is located near the lower end of said surface while the outlet opening 16 is positioned at a distance above the higher end thereof, the natural upward path of the incoming air and outgoing products of combustion is uninterrupted and the flow thereof is facilitated, the bevels 17 and 17ᵃ still further reducing any tendency to the generation of friction. In other words a continuous clear natural path for the incoming air and outgoing products of combustion is provided, the upper side apertures providing still further exits for said products of combustion so that a maximum of heat is secured with a minimum of fuel and friction is substantially eliminated. With this arrangement the combined area of the outlets for the products of combustion is greater than the area of the air inlet, in consequence of which the expanded products of combustion may readily escape at the required speed to prevent interference with or obstruction of the incoming air. The concave portion 12 provides a maximum air space beneath the burner so that the flames each receive the desired quantity of air, the upwardly inclined inner surface of the bottom in addition to the functions above described also assuring the conduction of a sufficient amount of air to all the successive flame jets even those nearest the apex of the iron, and making it possible to advantageously use different kinds of gases. By corrugating the portion 12 and surfaces 13 the heating surface is increased in area and channels for the incoming air and outgoing products of combustion are provided from the rear to the front of the iron. It will of course be understood that in some cases the inner surface of the bottom need not be inclined as described and also that the corrugations thereof may be omitted if desired. By directing the openings 37 and consequently the flames thereat more and more toward the front of the iron as the apex thereof is approached, the flames at said openings will successively exert a greater suction action so that the amount of air necessary to produce complete combustion will reach all of said flames and thus bring about a most efficient and uniform heating effect and a complete utilization of the fuel. The burner structure itself also assures an ample supply of fuel at all of the openings 37 at all times, the chamber formed by the member 33 and cover 38 acting as a sort of reservoir for fuel as it were. The screens 43 serve to disintegrate the fuel before it reaches the flames and thus make it possible to use relatively large jet openings 37 with the result that comparatively large flames are produced thereat and the heating of the iron thus facilitated. The said screens or gauze also serve to filter the fuel, thus giving a clean flame and making it possible to use either natural or manufactured fuel without necessitating any change or substitution of parts of the iron, said screens further absolutely preventing back fire or the like. The burner and its connected parts may be easily removed from and replaced in the iron and may be readily taken apart for cleaning or other purposes. The construction and arrangement of burner shown and described permits the iron to be used with any type of gas at any pressure without necessitating any special adjustment or the substitution of any specially designed parts. The cover swinging in a horizontal plane permits of ready access to the interior of the body and may be opened as above described in a simple manner without requiring the adjustment of any screws or the like which become hot and thus temporarily impossible to handle, the locking and unlocking of said cover being automatic and accomplished through the medium of the handle.

It will of course be understood that different types of burner from the one specifically shown may be used in connection with the present iron if desired.

Various changes in the specific form shown and described may be made within the scope of the claims without departing from the spirit of my invention.

I claim:

1. In a self-heating sad iron, the combination of a hollow body, a bottom therefor having its inner surface concaved transversely at its central portion and flattened at opposite sides of said concave portion and a burner located in said body above said concave portion.

2. In a self-heating sad iron, the combination of a hollow body, a bottom therefor having its inner surface concaved and inclined upwardly throughout its length toward the front of the iron and a burner located in said body above said concave surface.

3. In a self-heating sad iron, the combination of a hollow body, a bottom therefor having its inner surface concaved transversely at an intermediate point, corrugations extending lengthwise of the concaved portion of said inner surface continuously throughout its length and a burner located in said body above said concave surface.

4. In a self-heating sad iron, the combination of a hollow body, a bottom therefor having its inner surface concaved, an inlet opening at the rear end of said body in close proximity to said concave portion, a forwardly projecting outlet opening in the apex of said body at a distance above said concave portion and a burner located in said body above said concave surface.

5. In a self-heating sad iron, the combination of a hollow body, a bottom therefor having its inner surface concaved, an inlet opening at the rear end of said body in close proximity to said concave portion, an outlet opening in the apex of said body at a distance above said concave portion, and having a wall inclined downwardly toward said bottom and a burner located in said body above said concave surface.

6. In a self-heating sad iron, the combination of a hollow body, a bottom therefor having its inner surface inclined upwardly throughout its length toward the front of the iron, an inlet opening at the rear end of said body in close proximity to said inner surface, a forwardly projecting outlet opening in the apex of said body at a distance above said inner surface and a burner located in said body.

7. In a self-heating sad iron, the combination of a hollow body, a bottom therefor having its inner surface concaved, an inlet opening at the rear end of said body in close proximity to said concave portion, an outlet opening in the apex of said body at a distance above said concave portion, additional outlets extending higher than said outlet opening and located at the upper portions of the side walls of said body and a burner located within said body.

8. In a self-heating sad iron, a hollow body, a burner located therein and provided with jet openings, the openings near the rear end of the burner pointing in a direction at substantially a right angle to the axis thereof and successive openings pointing toward the front of said iron in a gradually increasing oblique direction to said axis and means for conducting fuel to said burner.

9. In a self-heating sad iron, a hollow body, a burner located therein and comprising an elongated hollow chamber having downwardly converging side walls, jet openings formed in said side walls, the openings near the rear end of said burner pointing in a direction at substantially a right angle to the axis thereof and successive openings pointing toward the front of said iron in a gradually increasing oblique direction to said axis and means for conducting fuel to said chamber.

10. In a self-heating sad iron, a hollow body, a burner located therein and comprising detachably connected sections forming a hollow chamber, jet openings formed in said burner, screens extending over the inner ends of said openings, coöperating means on said burner sections engaging said screens whereby the latter are removably maintained in said chamber and means for conducting fuel to said chamber.

11. In a self-heating sad iron, a hollow body, a burner located therein and comprising a trough like member converging toward its front end, jet openings in the side walls thereof, a cover movably secured upon said member and forming therewith a chamber and a tube communicating with said chamber through an end wall of said member and adapted for connection with a source of fuel supply.

12. In a self-heating sad iron, a hollow body, a burner located therein and comprising a trough like member, jet openings in the side walls thereof, a cover movably secured upon said member and forming therewith a chamber, screens in said chamber extending over the inner ends of said openings, flanges on said member and cover respectively for maintaining said screens in position in said chamber and means for conducting fuel to said chamber.

13. In a self-heating sad iron, a hollow body, a burner located therein and comprising an elongated trough like member having downwardly converging side walls, jet openings formed in said side walls, the openings near the rear end of said burner pointing in a direction at substantially right angles to the axis thereof and successive openings pointing toward the front of said iron in a gradually increasing oblique direction to said axis, a cover movably secured upon said member and forming therewith a chamber, screens in said chamber extending over the inner ends of said jet openings, flanges on said member and cover respectively for maintaining said screens in position in said chamber and a tube communicating with said chamber through an end wall of said member and adapted for connection with a source of fuel supply.

14. In a self-heating sad iron, the combination of a hollow body, a bottom therefor having its inner surface concaved, a burner extending through the rear wall of said body into the interior thereof and comprising an elongated chamber located above said concave surface and having downwardly converging side walls, jet openings formed in said side walls, a tube located exteriorly of said body and adjustably connected with said burner so as to communicate with said chamber, said tube being adapted for connection with a source of fuel supply and means accessible from the exterior of the body for securing said tube in an adjusted position.

15. In a self-heating sad iron, a hollow body, a burner located therein, a cover pivotally secured upon said body to move in a plane parallel with the bottom of the iron and means for automatically locking said cover in its closed position and releasable for permitting said cover to be moved to an open position.

16. In a self-heating sad iron, a hollow body, a burner located therein, a cover pivotally secured upon said body to move in a plane parallel with the bottom of the iron, a resilient catch for automatically locking said cover in its closed position, and a handle carried by said cover for manipulating the iron and for releasing said cover from said catch.

17. In a self-heating sad iron, a hollow body, a burner located therein, a cover pivotally secured upon said body to move in a plane parallel with the bottom of the iron, a resilient catch for automatically locking said cover in its closed position, a handle carried by said cover for manipulating the iron and for releasing said cover from said catch and means on said catch for preventing the one end of said cover from being lifted relatively to the body as the iron is manipulated.

18. In a self-heating sad iron, a hollow body, a burner located therein, a cover pivotally secured upon said body to move in a plane parallel with the bottom of the iron and provided at one end with a notch, a resilient catch member secured upon said body, a projection on said catch member adapted to coöperate with said notch to lock said cover in its closed position, said notch and projection being located to one side of the longitudinal median line of said body and a handle carried by said cover for manipulating the iron and for disengaging said projection from said notch to release said cover.

In testimony whereof I have hereunto set my hand in the presence of two subscribing witnesses.

OTTO SPAHR.

Witnesses:
  JOHN A. KEHLENBECK,
  FRITZ ZIEGLER, Jr.

Copies of this patent may be obtained for five cents each, by addressing the "Commissioner of Patents, Washington, D. C."